(No Model.)
J. O. CARROLL.
CULTIVATOR.
No. 538,319.
Patented Apr. 30, 1895.
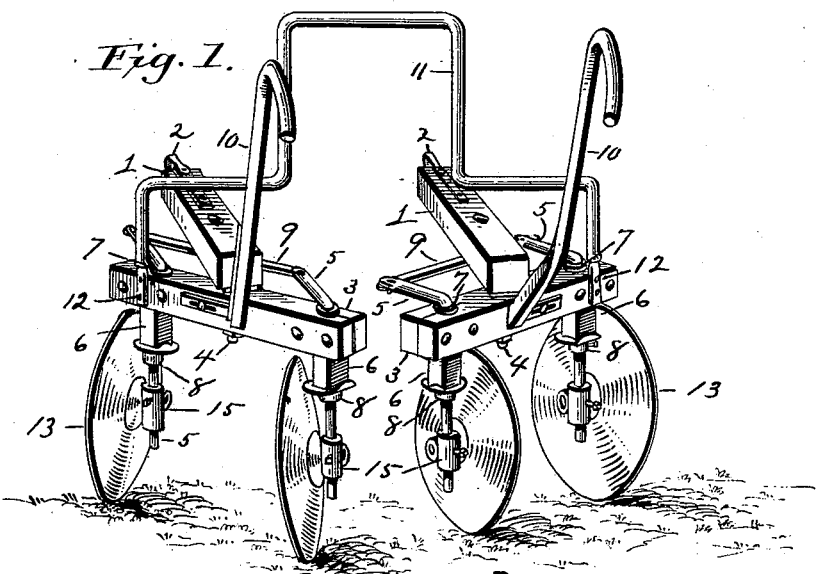
Fig. 1.
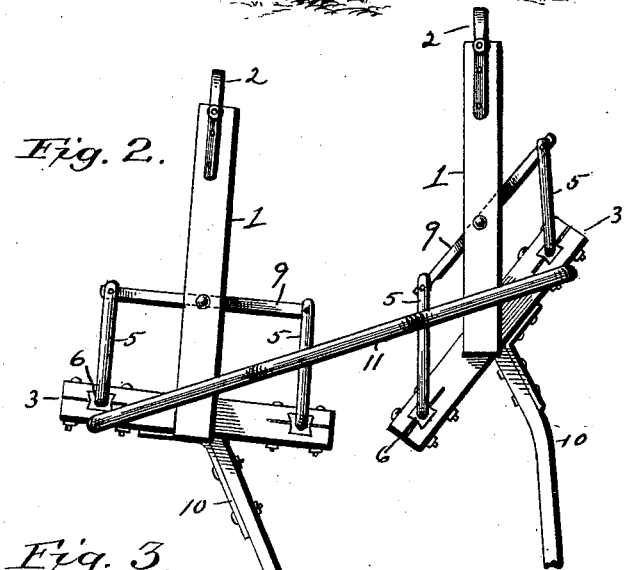
Fig. 2.
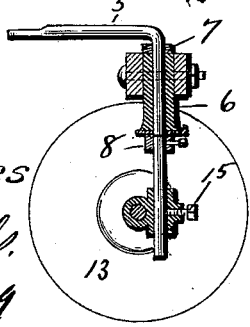
Fig. 3.
Fig. 4.
Witnesses
Inventor.
James O. Carroll
By Hayden, Hayden
Attys.

UNITED STATES PATENT OFFICE.

JAMES O. CARROLL, OF PITTSFIELD, ILLINOIS, ASSIGNOR TO HIMSELF AND JEFFERSON ORR, OF SAME PLACE.

CULTIVATOR.

SPECIFICATION forming part of Letters Patent No. 538,319, dated April 30, 1895.

Application filed January 3, 1895. Serial No. 533,785. (No model.)

*To all whom it may concern:*

Be it known that I, JAMES O. CARROLL, a citizen of the United States, residing at Pittsfield, in the county of Pike and State of Illinois, have invented a certain new, useful, and valuable Improvement in Cultivators, of which the following is a full, clear, and exact description.

My invention has relation to cultivators and it consists in the novel construction and arrangement of its parts as hereinafter described.

In the accompanying drawings, Figure 1 is a perspective view of the cultivator. Fig. 2 is a top plan view of the cultivator. Fig. 3 is a detail view of a disk and attachments used on the cultivator. Fig. 4 is a sectional view of a plow shovel that may be used on the cultivator.

The cultivator is provided with two beams 1, 1, to the front ends of which are secured the clevises 2, 2, or other suitable devices by means of which the horse is attached to the cultivator. A bar 3, is pivoted to the rear end of each beam 1, by means of the bolt 4. (See Fig. 1.) Each bar 3, is provided with a number of arms 5, 5. Said arms are journaled in the bearings 6, which in turn are located in the said bar 3. The arms 5, 5, are bent rectangular (see Fig. 3) and the said arms are secured in the bearings by means of the adjustable collars 7, and 8, one secured above and the other below the bearing 6. The forward ends of the arms 5, are pivoted to the rod 9. Said rods are also pivoted to the beams 1. Each bar 3, is provided with a handle 10. The yoke 11, connects the two bars 3. The ends of the said yoke are set on the pivot points 12, 12, which are secured to the said bars. Each bar 3, carries two or more disks 13. The lower ends of the arms 5, are adapted to carry disks 13, or plow shovels 14. The disk 13, is journaled to a sleeve, and said sleeve fits on the end of the arm and is secured by the screw 15. The plow shovel 14, is secured to the end of the arm 5, by means of the split sleeve 16.

The cultivator is designed especially for working crooked corn. The corn passes between the bars 3, 3, and under the yoke 11. The operator following behind the cultivator and by pushing the handles 10, 10, to the right or left works the disks or shovels about the corn, and if the corn is planted in crooked rows it can be worked with the cultivator without plowing it up. A sulky may be attached to the cultivator and thus the operator may ride and operate the arms 3, or the handles 10.

Having described my invention, what I claim as new, and desire to secure by Letters Patent, is—

A cultivator consisting of two independent parts; each part pivoted to one end of a yoke and thereby connected to the other part each part having a beam and a bar pivoted to each beam; a number of parallel arms consisting of single straight rods of uniform thickness throughout bent at an angle at an intermediate point, said arms perpendicularly journaled in the bar just below the apex of the angle, the upper ends of the arms pivotally connected to a rod substantially parallel to the bar; the removable collar secured to the perpendicular portions of the arms just below the bar; the disk or shovel having a collar adapted to surround and be adjusted and secured in place on the lower end of the arm, as set forth.

In testimony whereof I affix my signature in presence of two witnesses.

JAMES O. CARROLL.

Witnesses:
W. S. BINNS,
P. T. McGAREY.